Figure 1:
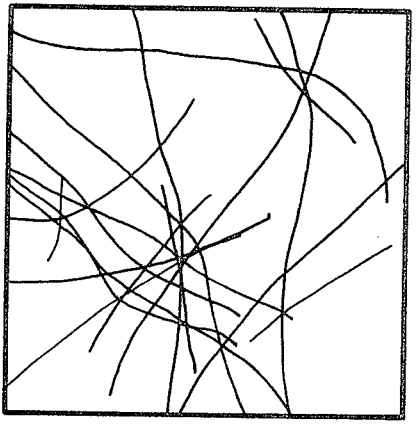

United States Patent Office 3,364,975
Patented Jan. 23, 1968

3,364,975
PROCESS OF CASTING A MOLTEN METAL WITH DISPERSION OF FIBROUS FORM OF BETA SILICON CARBIDE
Bernard A. Gruber, Boxford, Mass., assignor to Monsanto Company, a corporation of Delaware
Application Jan. 3, 1961, Ser. No. 80,402, now Patent No. 3,246,950, dated Apr. 19, 1966, which is a continuation-in-part of abandoned application Ser. No. 803,176, Mar. 31, 1959. Divided and this application Nov. 24, 1964, Ser. No. 413,497
3 Claims. (Cl. 164—55)

The present application is a division of Ser. No. 80,402, filed Jan. 3, 1961, now Patent No. 3,246,950, and a continuation-in-part of Ser. No. 803,176 (now abandoned) filed Mar. 31, 1959.

The present invention relates to a new composition of matter and to new and useful articles of manufacture derived therefrom. The invention also relates to a new process for the manufacture of the same.

The present invention is concerned with a fibrous form of silicon carbide as a new composition of matter. It is an object of the invention to prepare a high strength form of silicon carbide existing as discrete fibers which have utility in a number of relationships. It is also an object of the invention to prepare high strength articles of manufacture based upon the said fiber in combination with metals, ceramics or plastics in which the novel fibrous form of silicon carbide is employed as a reinforcing and hard surfacing component.

Another object of the invention is to manufacture refractory compositions based upon the new form of silicon carbide.

It is also an object of the invention to provide a method for the production of silicon carbide in the form of discrete fibers as well as in the form of composited and felted masses of the said fibrous silicon carbide. It is consequently another object of the invention to prepare insulating materials fabricated from the felted or bonded aggregation of the fibrous form of silicon carbide.

Another object of the invention is the preparation of an exceedingly pure variety of silicon carbide existing in a fibrous form. This type of silicon carbide is particularly useful in electrical and electronic applications because of its unusually high degree of purity, thus rendering the silicon carbide suitable for use in semiconductor applications.

It is also an object of the invention to prepare silicon carbide in a fibrous form by the reaction of silicon monoxide and carbon monoxide from the gas phase. The reaction product is deposited from the gas phase in discrete fibers and loose aggregations of the fibers.

Conventional silicon carbide as prepared in the electric furnace by the reaction of silicon carbide (such as sand) and carbon (utilized in the form of coke) is obtained in massive form, for example, as lumps ranging from a few inches to several feet in diameter. Such commercial silicon carbide crystallizes in an alpha-crystalline modification, although the beta form exists therewith in relatively minor proportions with the alpha-crystalline form.

While such commercial silicon carbide is well known as a high temperature refractory, it is limited in application as a high temperature insulating material because of its relatively good thermal conductivity. It has also been found that a disadvantage of commercial silicon carbide in electronic uses is that the purity which can be achieved in the production of silicon carbide from silicon and carbon is quite limited. It is therefore impossible by conventional methods to obtain a semiconductor grade of silicon carbide. The high density which is characteristic of electric furnace silicon carbide is also disadvantageous in many relationships where weight limitations are critical.

It has now been found that an entirely new form of silicon carbide is existing in a beta crystalline modification and characterized by a fibrous structure may be obtained by the reaction of silicon monoxide and carbon monoxide in the gas phase. The product thus obtained is consequently not sublimed from a solid phase but is formed directly by precipitation from the gas phase to yield the desired fibers. This product exists in fibers having a diameter of from 50 angstroms to 10,000,000 angstroms and varying in length from quite short fibers (e.g. 250 angstroms) to lengths as great as 2,500,000 angstroms, e.g. about 1 inch maximum length for the fibers which look like single hairs. In general, the length to diameter ratio of the present silicon carbide fibers may vary over a wide range such as from 5:1 to 50,000,000:1 and even more. It is unusual for an inorganic crystalline material to build up continuous fibers, particularly in the length-diameter ratios as high as those which have been observed in the present work.

The silicon monoxide which is employed in the present gas phase reaction may be obtained by conventional means such as the preliminary reaction of elemental silicon with carbon monoxide, or by the reduction of silicon dioxide to obtain the monoxide. The gaseous silicon monoxide is then reacted in the vapor phase with gaseous carbon monoxide to form silicon carbide which crystallizes in the form of fibers. In order to direct the reaction towards the production of the desired product, it has been found necessary to operate within the temperature range of from 1,100° C. to 2,200° C., a preferred temperature range being from 1,300° C. to 1,600° C. The collection temperature is not critical, although it is preferred that a cooler region be available, e.g., at 400° C. to 1,500° C. as a collection zone. However, fibers are also condensed or deposited in the high temperature reaction zone at temperatures of the order of 1,500° C. to 1,600° C.

The stoichiometric proportions of gaseous SiO and CO utilized in the reaction are 3 moles of silicon monoxide, SiO, to 1 mole of carbon monoxide, CO. However, it has been found essential in the present process in order to obtain high yields of the fibrous product to have an excess of CO present relative to the SiO. A preferred range of proportions is from 25% to 99.99% by volume of CO present in 100 parts by volume of the gaseous reactants. If an inert gas is desired as a diluent, for example, argon or helium, the above proportions between the SiO and CO are still maintained. When an inert gas is used, for example, as a carrier medium to introduce the gaseous SiO into the reaction system, the proportion of the inert gas is not critical, and may vary widely, such as from 5% to 99.9% by volume relative to the SiO and CO which are the reacting gases. The total pressure on the system is not critical and may range from vacuum conditions, for example, 0.10 atmosphere to superatmospheric conditions, e.g., as much as 100 p.s.i. Thus, when operating at 1,327° C., the partial pressure of the carbon monoxide is 756.7 mm. and the partial pressure of the silicon monoxide is 3.3 mm. when utilizing 1 atmosphere (actual pressure 760 mm.) total pressure. The residence time in a flow system is not critical; it has been found that fibers are obtained at residence time of 0.01 second and also at 1000 seconds.

The fibers of silicon carbide obtained by the method described above are exceedingly pure because of the crystallization from the vapor phase which apparently results in a selective purification with the elimination of otherwise common impurities. The fibers have been found to be easily obtainable with a purity such that there is less than 0.01 p.p.m. total impurities present. For this reason the present fibrous form of silicon carbide is a useful starting material in the conventional sublimation process of preparing an ultra-pure material. However, the sublimate thus produced has been found not to have a fibrous structure. The color of the fibers range from white through gray to black. When the fiber diameters are of the order of the wavelengths of visible light, the color is white.

The product obtained by the primary reaction of silicon monoxide with carbon monoxide is a pure fibrous material which may contain some spherical particles of silicon dioxide as an impurity. For example, the silicon carbide may range from 40% to 99% by weight, although 100% SiC is also common. For many purposes such technical grade mixtures are eminently satisfactory, for example, as medium temperature insulating compositions which are useful, for example, in the range of from 500° C. to 1,400° C. However, if it is desired to obtain a very pure form of silicon carbide free from the microspheres of silicon dioxide, it has been found that the silicon dioxide is readily removed by washing the product with hydrofluoric acid. This acid may be used in any convenient concentration, for example, from 5% to 100% HF. Thus, the laboratory grade of acid having a concentration 50% in water may readily be employed, although the technical grade which has an analysis of 25% HF is equally satisfactory. Hydrogen fluoride gas (100% HF) is also applicable in this relationship, since the resultant reaction product of silicon dioxide with HF is silicon tetrafluoride which is volatilized as a gas. The hydrogen fluoride treatment may also be supplemented by the use of nitric acid, as a separate treatment using any desired concentration, for example, 5% to 100% HNO₃. Mixtures of nitric and hydrofluoric acids may also be used in this relationship.

The fibrous silicon carbide is unaffected by treatment with acids.

The fibrous silicon carbide has been found by X-ray diffraction to be present in the beta modification having a cubic space lattice. At very high temperatures, this beta crystal form may undergo some modification to the alpha form. Silicon carbide fibers do not melt, but in an inert or reducing atmosphere are stable up to 2600° C. at which temperature silicon carbide decomposes.

The fibers of silicon carbide as produced in the present invention are extremely strong. It has been shown that individual fibers have a tensile strength of the order of 10,000,000 p.s.i., which is further indication of the existence of the silicon carbide as a monocrystalline, covalent filament with a single axial screw dislocation. In comparison to pure iron "whiskers," such as have recently been produced, the strength of such high purity iron is only about 3,000,000 p.s.i.

The present form of fibrous silicon carbide exists as single crystals. This has been proved by the electron microscopic examination of the fibers which reveal electron diffraction lines next to the fibers, thus indicating the single crystal structure.

Figure 2:
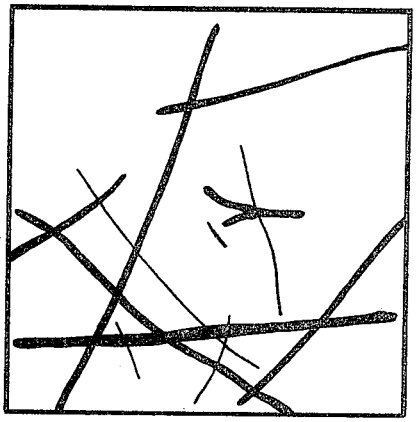

The drawings of the present application illustrate a magnified view of the product of the present invention as seen under the electron microscope. FIGURE 1 at a magnification of 15,000 illustrates the longer forms of the present fibers of silicon carbide. In this drawing, the fibers have an average diameter of about 800 angstroms and a length of up to about 1,000,000 angstroms. The length/diameter ratio of the fibers of FIG. 1 ranges from about 1,000 to about 12,000. FIG. 2 at a magnification of 15,480× shows the smaller fibers of silicon carbide obtained in the practice of the present invention. The fibers shown in FIG. 2 have individual fiber lengths of about 1,000,000 angstroms and individual fiber diameters of about 6,000 angstroms, i.e., a length-diameter ratio of about 166.

The following examples illustrate specific embodiments of the present invention.

Example 1

The production of the fibrous form of silicon carbide was carried out utilizing separate sources of gaseous silicon monoxide and gaseous carbon monoxide. The silicon monoxide was produced in a separate furnace by heating a mixture of approximately equal weights of metallic silicon and silicon dioxide (washed sea sand). This mixture was heated to a temperature of about 2,000° C., at which temperature silicon monoxide was evolved as a gas. The stream of gaseous silicon monoxide was then led into a Vycor tube reactor which also contained a conduit for the introduction of carbon monoxide. External heating means were provided for this reactor using a series of electrical resistors to bring the reactor temperature to 1,300° C. The gas streams were maintained with a flow rate of about 3 parts by volume of carbon monoxide to 1 part by volume of silicon monoxide. A precipitation product resulting from the interaction of the two gas streams was found to be a pure white, fluffy, fibrous mass of silicon carbide fibers which deposited upon both the hot and cold parts of the reactor tube. The individual fibers were approximately 50,000 angstroms in length and about 6,000 angstroms in diameter.

Example 2

The production of fibrous silicon carbide was carried out in a porcelain tube located in a 2-zone furnace. The first zone was maintained at 1950° C. and the second zone at 1,250° C. The charge located in the first zone consisted of a mixture of a commercial grade of silicon carbide and silicon dioxide (sand) in approximately equal proportions. This mixture was placed at the hottest point in the first zone and was found to evolve gaseous silicon monoxide. After the charge mixture had been brought up to equilibrium, the entire furnace was evacuated by means of suitable vacuum pumps until the pressure was below 100 microns with an excess of carbon monoxide over the amount required for the theoretical reaction between the silicon monoxide and carbon monoxide. The fibrous silicon carbide was deposited in the 1,250° C. zone of the furnace as a deposit growing radially inward along the length of the collection tube.

Example 3

In order to obtain an electronic grade of silicon carbide, the porcelain furnace used in Example 2 was charged with chemically pure elemental silicon in the first zone of the furnace. The silicon was oxidized at a temperature of 1,350° C. by passage of gaseous carbon monoxide over the elemental silicon with the resultant evolution of silicon monoxide. The temperature was regulated and the flow velocity of the carbon monoxide adjusted to a rate of 60 cc./min./in.² of exposed silicon surface to maintain the carbon monoxide at about 90% by volume of the total gas mixture with the remainder being silicon monoxide in the secondary reaction zone at 1,250° C. The fibrous silicon carbide was found to condense from the vapor phase upon the cooler portion of the furnace tube.

Example 4

In order to obtain silicon monoxide for the desired reaction with carbon monoxide, a two-zone furnace system as described in Example 1 was utilized in the present example. The primary zone of the furnace was charged with a mixture of an excess of carbon with silicon dioxide. This mixture was heated to a temperature of about 1,950° C., after which the furnace was evacuated to a pressure of about 100 microns of mercury pressure. A stream of carbon monoxide was then admitted to the secondary reaction zone. Silicon monoxide also entered the secondary zone from the primary part of the furnace containing the above-described charge. The secondary zone maintained at a temperature of about 1,200° C. then served as a collection area for the reaction product of the silicon monoxide and the carbon monoxide. The product was a pure white fibrous form of silicon monoxide.

The product obtained in the above examples was found to be a very fine, continuous, fibrous form of silicon carbide having a fiber length ranging from about 250 angstroms to 2,500,000,000,000 angstroms and with a fiber diameter ranging from 50 angstroms to 10,000,000 angstroms. In general, the ratio of fiber length to diameter was from about 5:1 to 50,000,000:1.

The fibrous product when subjected to chemical analysis was found to consist of a very pure form of silicon carbide without the production by the present process of any silicon oxycarbides.

In general, the fibrous silicon carbide of the present invention may be used to improve the strength of shaped objects prepared from any continuous medium which can be reinforced, for example, metals, ceramics, and polymerized organic monomers. Examples of metals which are of particular utility include iron, titanium, molybdenum, vanadium, uranium, beryllium, aluminum, copper, and compounds and alloys thereof. The ceramic materials include the various oxide compositions, such as complex silicates used for the production of porcelain and other white ware. Examples of monomers which can be polymerized to obtain high strength articles having dispersed silicon carbide therein include phenolic resins (preferably beginning with a preliminarily polymerized material), and other condensation polymers, e.g., nylon, vinyl resins such as polyvinyl chloride, acrylic monomers, such as methyl methacrylate, styrene, etc., and polymerized olefin hydrocarbons, such as polyethylene, natural and synthetic rubbers, and epoxys such as are based upon isocyanates.

The fibrous form of silicon carbide as produced in accordance with the present invention is of particular utility as a reinforcing material in the fabrication of articles of manufacture from metals, ceramics and organic plastics, such as polymerized organic monomers.

*Example 5*

The formation of a nose cone for a rocket was carried out by admixing 100 g. of fibrous silicon carbide in the "as produced" condition (i.e., containing about 1% by weight of microspheroids of silicon dioxide) together with 900 g. of a phenol-formaldehyde resin in the B-stage of partial polymerization. The mixture of the powdered resin, together with the fibrous silicon carbide, was then placed in a mold having the desired shape of a nose cone and subjected to 250° F. heating for a period of 5 minutes.

In the manufacture of high strength metal articles by casting from a shaped mold, the fibrous silicon carbide is either uniformly dispersed throughout the metal or applied to the surface of the mold to be taken up by the molten metal and concentrated at the external surface of the casting. In this latter process, the fibrous silicon carbide for mold facing is first dispersed in a liquid material, preferably water by suspending the fibers therein. In order to provide a stable suspension, the slip is usually prepared with the addition thereto of a suspending agent such as carboxymethylcellulose. If desired, a clay-like material such as bentonite may also be included in the slip. This slip containing the fibrous silicon carbide is then applied to the surface of the mold. The mold may be made of sand, a plastic-sand combination, a high melting point metal or a ceramic such as calcium sulfate and/or magnesium oxide. In this way, a substantial thickness of the fibrous silicon carbide is deposited upon some or all of the surfaces of the mold. When the molten metal is poured into the mold, the fibrous silicon carbide is dispersed in the metal but is concentrated in the external surfaces thereof. In this way, there is obtained a hardened and wear-resistant external surface of the metal.

Another fabrication method to produce metals strengthened by the fibrous silicon carbide is to deposit metal upon the fibers and then shape or otherwise fabricate the mass of composite fibers to the desired form, for example, by powder metallurgical techniques such as pressing and sintering. For example, an unconsolidated loose mass of silicon carbide fibers is readily electroplated with copper, e.g., from 50% to 50,000% by weight of metal by electrodeposition. Other methods of applying a metal such as aluminum, iron, cobalt, nickel, tungsten, or molybdenum to the silicon carbide include electrodeless plating of a metal such as nickel from salts thereof and chemical reduction of various metal compounds such as nickel, carbonyl, tungsten, pentachloride, and aluminum acetoacetate using either liquid or vapor phase methods. The deposited metal is in exceedingly intimate contact with the base fibrous silicon carbide. When the composite mass of material is sintered or compressed, the metal becomes the continuous phase with the fibers of silicon carbide being dispersed throughout the metal as a reinforcing or dispersion hardening agent. In this way, the physical strength and also the high temperature properties of the metal are greatly improved.

In the use of fibrous silicon carbide for reinforcing metals, the fibers may be dispersed in the metal matrices such as by addition to the molten metal. In this way, an extremely intimate dispersion may be obtained similar to the dispersion strengthening of metals. The sheet or paper form of aggregated fibrous silicon carbide is also of utility in the preparation of laminates and hard surfaces fabricated with various metals such as copper, die casting compositions, aluminum, iron and ferrous alloys. In this method of fabrication, the reinforcing sections of the fibrous silicon carbide as a bat, or in paper form are located along the face edges of a mold. Liquid metal is then poured into the mold with the result that the fibrous silicon carbide becomes dispersed within the metal, while being concentrated in the external surfaces of the molded metal objects. In this way, it is possible to hard-surface or strengthen the outer wearing areas, or any other desired section and to obtain a wear-resistant and hardened metal area.

In addition to the conventional metals, the use of combined metals in alloys and compounds is a part of the present invention.

Ferrous alloys such as steel, e.g., stainless steel, are greatly improved in hardness by the addition of the present fibrous silicon carbide. Less common metals including titanium per se, or in combined form, e.g., titanium diboride, are of utility for this purpose. The silicon carbide fibers can also be beneficially incorporated into the refractory hard metal, such as borides, silicides, carbides, nitrides, and phosphides, which exist in metallic form or as compounds, such as silicon boride, molydenum disilicide, titanium carbide, boron nitride, and boron phosphide. For example, a body formed of zirconium diboride containing 25% of the fibrous form of silicon carbide and fabricated by hot pressing was found to display vastly superior thermal shock properties in comparison to the zirconium diboride fabricated without the silicon carbide fibers.

*Example 6*

The introduction of fibrous silicon carbide as a wear-resistant surface in metal casting was shown in the casting of aluminum. Molten aluminum was poured into a rectangular mold, the walls of which had adhering thereto a layer of the "paper" form of fibrous silicon carbide. It was found that the fibrous silicon carbide was dispersed at the external molten surface of the metal and concentrated at the surface in the hardening of the aluminum. The surface was thereby hardened and provided with superior wear-resistant properties.

The term "ceramics" as employed herein refers to the inorganic oxides and combinations therein which are consolidated by heating to a high temperature. Thus, the conventional metal oxides and combined forms are of utility in the fabrication of shaped articles. For example, a sillimanite ($Al_2C_3 \cdot SiO_2$) body containing 10% of the fibrous form of silicon carbide is found to have a greater impact strength than the ordinary sillimanite without this additive.

Example 7

A fibrous form of silicon carbide was prepared by beginning with silicon carbide and silica as the starting materials.

A graphite boat was charged with a mixture of 1.219 grams of $SiO_2$ (finely divided amorphous silica) and 6.485 grams of silicon carbide (600 mesh). The loaded boat was then placed in an electric tube furnace provided with a vacuum control system. The furnace was heated to 1,350° C. and the pressure maintained at 40–100 microns for 65 hours. At the end of this time, the furnace was opened and the product (0.1187 gram) found to be a fibrous or thin columnar hair like pieces. The blue-gray product condensed from the gas phase at the beginning of the cold zone of the furnace. The fibers were analyzed by X-ray diffraction, and found to be beta (cubic) crystalline silicon carbide.

It is also an embodiment of the invention to prepare high strength articles of manufacture for high temperature service comprising a skeletal structure of the present fibrous form of silicon carbide with a reinforcing agent in intimately bonded admixture therewith, the said reinforcing agent being selected from the group consisting of carbon metals and oxides. Suitable metals for this purpose include refractory metals such as nickel, cobalt, tungsten, molybdenum and the like. Suitable oxides include zirconia, thoria, silica, and the like.

The carbon may be introduced into the shaped articles as a resinous material together with fibrous silicon carbide, which composite article is subjected to a high temperature, for example, a phenol-formaldehyde resin or other carbon containing plastic heated to a temperature of 1,000° C., in order to transform the carbon content to an intimately admixed form of fine particles creating a reinforcing structure with the skeletal fibrous silicon carbide. When metals such as tungsten are employed as the reinforcing agent with the fibrous silicon carbide, the metals may be introduced as finely divided powders which are consolidated with the fibrous silicon carbide by conventional means such as hot pressing, sintering, etc. Oxide materials may be incorporated by spraying, pressing, or chemical reduction.

Another source of carbon in the present composite compositions with the fibrous silicon carbide is the type of carbon known as pyrolytic graphite resulting from the elemental decomposition of gaseous hydrocarbons such as methane, ethane, propane, butane, benzene, toluene, etc. In carrying out this process to obtain a composite product, a shaped object, such as a nose cone, is first provided as a mandrel of molybdenum or other temperature stable material. This mandrel is the base upon which the pyrolytic graphite is deposited, for example, by thermally pyrolytic decomposing methane at 2,000° C. The resultant pyrolytic graphite coating consisting of oriented graphite platelets in contrast to the conventional randomly oriented graphite. The pyrolytic graphite is the base upon which the fibrous silicon carbide is added, such as by placing thereon a felted shell or "paper" of the aggregated fibrous silicon carbide. The layer of the fibrous silicon carbide may also be provided by painting the pyrolytic graphite with a dispersion of the fibrous silicon carbide in a medium such ethanol, water, or benzene, which medium is subsequently volatilized or burned off. Multiple layers or laminates can be formed in this way with the pyrolytic graphite bonding the silicon carbide fibers to give composite coatings which are characterized by unusually low thermal conductivity in the direction normal to the planes of the pyrolytic graphite, as well as extreme resistance to corrosion.

Example 8

The production of the fibrous form of silicon carbide was carried out utilizing separate sources of gaseous silicon monoxide and gaseous carbon monoxide. The silicon monoxide was produced in a separate furnace by heating metallic silicon and carbon dioxide, which gas was passed over the silicon. The metallic silicon was contained in a mullite boat in a tubular furnace maintained at about 1400° C. while the carbon dioxide was passed over the charge of 100 grams of silicon employing a carbon dioxide flow rate of 100 cc. per minute. The reaction between silicon and carbon dioxide resulted in the production of gaseous silicon monoxide which was then led into a Vycor tubular reactor which also contained a conduit for the introduction of carbon monoxide. External heating means were provided for this reactor using a series of electrical resistors to bring the reactor temperature to 1150° C. The respective gas streams entering this reaction zone were maintained with a flow rate of about 3 parts by volume of carbon monoxide to 1 part by volume of silicon monoxide. The Vycor tubular reactor also contained a centrally located thermocouple tube of mullite, and was provided with a series of thermocouples in order to measure the temperature profile through the reaction zone. After stable conditions had been reached, it was found that long fibers of silicon carbide were deposited radially upon the thermocouple tube located in the center of the reaction zone with the fibers extending outward to the external walls of the reaction vessel. The fibrous product was found to be a pure white fluffy mass which deposited in predominant proportion at the central portion of the reaction zone having a collection temperature area of from 1100° C. to 1300° C. However, it was observed that the effective collection temperature range from 1050° C. to 1350° C. The individual fibers were approximately 120,000,000 angstroms in length and about 6,000 angstroms in diameter.

The silicon monoxide which is employed in the present gas phase reaction may be obtained by conventional means such as the primary reaction of elemental silicon, or optionally, ferrosilicon, with carbon monoxide. Other methods for the production of the silicon monoxide are the reduction of silicon dioxide with carbon to obtain silicon monoxide. Another process is the reaction of elemental silicon with carbon dioxide to yield gaseous silicon monoxide.

Example 9

A variation of the process of the present invention was carried out by conducting a once-through process without the necessity of intermediate injection of carbon monoxide. This was accomplished by conducting the formation of silicon monoxide at a high rate of speed by the reaction of elemental silicon with carbon monoxide. The metallic silicon (100 grams) was contained in a mullite boat in a tubular furnace maintained at about 1400° C. while carbon monoxide was passed over the charge, employing a gas flow rate of 500 cc. per minute. Under these reaction conditions, the carbon monoxide was only partially transformed to silicon monoxide so that about 75% by volume of carbon monoxide was present as unreacted material at this stage. However, by continuing the passage of the gas mixture of silicon monoxide and carbon monoxide further through the tubular furnace at 1400° C., the carbon monoxide reacted with all of the silicon monoxide to yield the desired fibrous, mono-crystalline silicon carbide which deposited on the walls and the central solid ceramic core located at the symmetrical center of the reactor tube. The temperature in the collection zone was at about 1200° C.

Example 10

The use of carbon dioxide as a gaseous starting material is shown in the present example based upon the reaction of elemental silicon with carbon dioxide to yield a gaseous mixture of silicon monoxide and carbon monoxide in approximately 1 equimolar proportion. The metallic silicon was contained as 100 grams of fine powder placed in a mullite boat in a tubular furnace maintained at about 1500° C., while the carbon dioxide was passed over the charge at a flow rate of 100 cc. per minute. The reaction conditions were found to yield an equilibrium mixture with the conversion of all of the carbon dioxide to a gaseous mixture of silicon monoxide and carbon monoxide in equimolar proportions. This mixture was then passed further through the tubular reactor and the fibrous silicon carbide precipitated on the walls of the cooler section of the reactor tube at a temperature of about 1000° C. In general, the temperature of the collection zone has been found to be desirably maintained in the range of from 1100° C. to 1300° C., or more broadly from 1050 to 1350° C. The silicon carbide fibers were deposited radially and were found to have a length of about 100,000,000 angstroms and diameter of about 5,000 angstroms.

Another method of obtaining the desired silicon monoxide is by reacting elemental silicon with $CO_2$. This gives $SiO+CO$, and may be controlled to operate with any desired proportions within the range defined below, such as 25% by volume of CO relative to 100% of the total gas stream of $SiO+CO$.

In carrying out this process, a shaped object such as a nose cone is formed from pyrolytic graphite, for example, by pyrolyzing methane at 2000° C. in the presence of a molybdenum or other temperature stable mandrel having the shape of the desired nose cone. The resultant pyrolytic graphite coating consists of oriented graphite platelets in contrast to the conventional randomly oriented graphite.

The composite structure with fibrous SiC is then obtained by coating the previously prepared pyrolytic graphite object with a layer of fibrous SiC such as by felting, attaching a "paper" of the fibers or painting with a medium which is subsequently volatized or burned off, etc. Multiple layers or laminates can be formed in this way, with the pyrolytic graphite bonding the SiC to give composite coatings having unusually low thermal conductivity and extreme resistance to corrosion.

What is claimed is:

1. The process of casting a molten metal in a mold to obtain a casting characterized by a wear-resistant external surface which comprises in combination the steps of applying to the surface of the mold a slip of fibrous silicon carbide, existing as fibers which have a length to diameter ratio of at least 5, dispersed in water, and pouring the molten metal into the mold, whereby the said fibrous silicon carbide forms a wear-resistant external layer on the surface of the casting.

2. The process of casting a molten metal in a mold to obtain a casting characterized by a wear-resistant external surface, which comprises applying to the surface of the mold a slip of fibrous silicon carbide in the form of single crystals existing as fibers which have a length to diameter ratio of at least 5, together with about 1% by weight of particles of silicon dioxide, dispersed in water, and pouring the molten metal into the mold, whereby the said fibrous silicon carbide forms a wear-resistant external layer on the surface of the casting.

3. The process of casting a molten metal to obtain a reinforced metal product which comprises dispersing in the said molten metal a fibrous form of beta silicon carbide.

References Cited
UNITED STATES PATENTS

| | | | |
|---|---|---|---|
| 1,249,101 | 12/1917 | Jacobs | 164—95 |
| 2,406,683 | 8/1946 | Hensel et al. | 204—27 |
| 2,713,315 | 7/1955 | McBride | 29—196.6 |
| 2,728,124 | 12/1955 | Sofield | 22—202 |
| 2,737,483 | 3/1956 | Lowenheim et al. | 204—27 |
| 2,986,807 | 6/1961 | Elbaum | 29—182.8 |
| 3,054,166 | 9/1962 | Spendelow | 29—182.8 |
| 3,077,413 | 2/1963 | Campbell | 22—193 |
| 3,084,421 | 4/1963 | McDaniels et al. | 29—191.6 |
| 3,144,330 | 8/1964 | Storcheim | 75—226 |
| 3,162,531 | 12/1964 | Yamano et al. | 75—226 |
| 3,164,482 | 1/1965 | Renkey | 106—44 |
| 3,164,483 | 1/1965 | Renkey | 106—44 |
| 3,175,260 | 3/1965 | Bridwell et al. | 164—97 |

OTHER REFERENCES

Iley et al.: Article in Chemical Society Journal, 1948 pp. 1362–1366.

Silicon Carbide, by O'Connor et al., Pergumon Press (1960), pp. 78–82.

J. SPENCER OVERHOLSER, *Primary Examiner.*

MARCUS U. LYONS, *Examiner.*

E. MAR, *Assistant Examiner.*

UNITED STATES PATENT OFFICE
CERTIFICATE OF CORRECTION

Patent No. 3,364,975

January 23, 1968

Bernard A. Gruber

It is hereby certified that error appears in the above numbered patent requiring correction and that the said Letters Patent should read as corrected below.

Column 2, line 4, strike out "is"; line 13, for "2,500,000" read -- 2,500,000,000 --; column 5, line 4, for "2,500,000,000,000" read -- 2,500,000,000 --; column 6, line 47, for "molydenym" read -- molybdenum --; column 7, line 12, after "a" insert -- porous columnar ring composed of an agglomeration of --; column 9, line 33, for "volatized" read -- volatilized --.

Signed and sealed this 8th day of April 1969.

(SEAL)
Attest:

Edward M. Fletcher, Jr.
Attesting Officer

EDWARD J. BRENNER
Commissioner of Patents